United States Patent [19]

Seibel et al.

[11] 4,016,400
[45] Apr. 5, 1977

[54] OVERHEATING SAFETY DEVICE FOR ELECTRICAL LIGHTERS

[75] Inventors: Georg Seibel, Dreiechenhain; Günther Ante, Frankfurt am Main, both of Germany

[73] Assignee: Schoeller & Co. Elektrotechnische Fabrik, both of Frankfurt, Germany

[22] Filed: Mar. 18, 1975

[21] Appl. No.: 559,521

[30] Foreign Application Priority Data

May 20, 1974 Germany .......................... 2424885

[52] U.S. Cl. ............................ 219/264; 219/265; 219/267; 219/517; 337/407; 337/413; 337/416

[51] Int. Cl.[2] .................. H05B 1/02; H01H 37/76; F23Q 7/24

[58] Field of Search .......... 219/262, 263, 264, 265, 219/266, 267, 517; 337/382, 407, 401–416; 200/61.08, 61.19, 153 M, 250; 317/98

[56] References Cited

UNITED STATES PATENTS

| | | | |
|---|---|---|---|
| 1,500,399 | 7/1924 | Lanese | 337/413 X |
| 2,858,409 | 10/1958 | Dening | 219/264 |
| 3,383,494 | 5/1968 | Hubert | 219/265 |
| 3,385,940 | 5/1968 | Roper | 337/407 X |
| 3,419,703 | 12/1968 | Sicard | 219/265 |
| 3,573,428 | 4/1971 | Deming et al. | 219/265 |
| 3,641,469 | 2/1972 | Pramaggiore | 219/263X |
| 3,662,153 | 5/1972 | Barnes et al. | 219/265 |
| 3,778,742 | 12/1973 | Merrill | 337/407 |
| 3,781,737 | 12/1973 | Henry | 337/407 |
| 3,829,812 | 8/1974 | Inaba | 337/382 |
| 3,863,047 | 1/1975 | Mase | 219/265 |

Primary Examiner—A. Bartis
Attorney, Agent, or Firm—Toren, McGeady and Stanger

[57] ABSTRACT

A safety device for preventing deleterious overheating of an electrical lighter such as used in motor vehicles provides a short circuit in the electrical power supply circuit to the lighter upon occurrence of a dangerous overheating condition so that a circuit breaker in the circuit is actuated to deenergize the lighter. The safety device includes a pair of electrical contacts on the lighter socket separated by a thermoplastic insulating member in heat exchange relationship with the socket and being composed of a material which has a softening point above the normal operating temperature of the lighter but below the temperature at which thermal damage may occur in the vicinity of the lighter when overheating occurs. One of the contacts is spring biased toward the other and the softening of the insulating member allows the contacts to electrically engage under the force of the spring bias to establish a short circuit for actuating the circuit breaker. The insulating member may have an opening to assist establishment of electrical engagement of the contacts.

13 Claims, 8 Drawing Figures

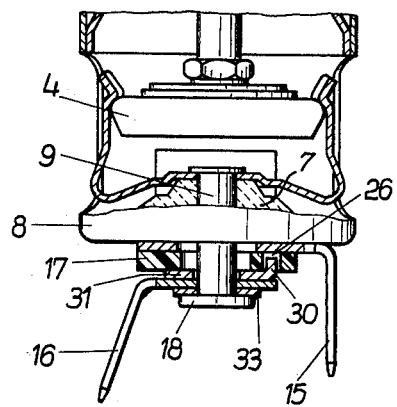
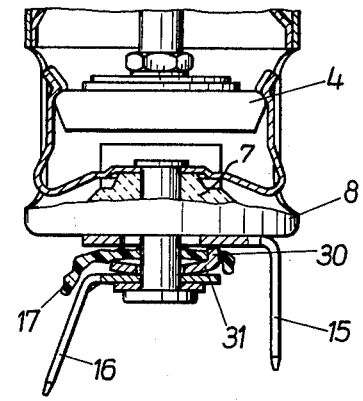
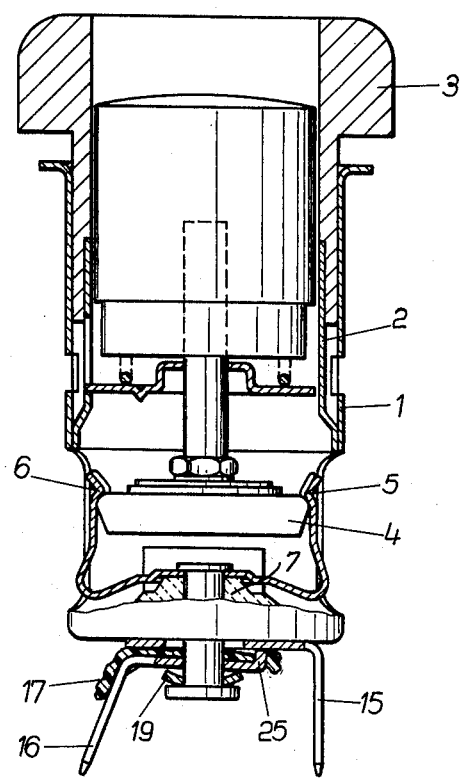
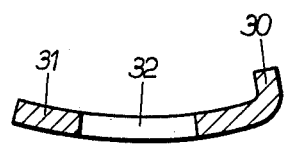
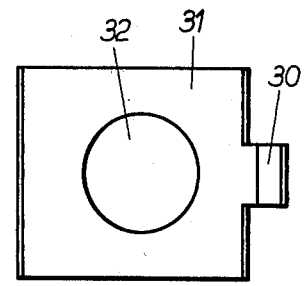
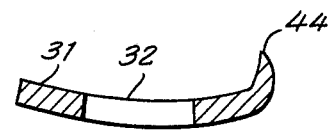

OVERHEATING SAFETY DEVICE FOR ELECTRICAL LIGHTERS

BACKGROUND OF THE INVENTION

The present invention relates to lighters disposed in motor vehicles and, more particularly, to overheating safety devices for such lighters.

Automotive vehicles more recently have plastic instrumentation boards in which the cigarette lighters are installed. In the event that the lighter has some electrical breakdown and excessive heat is generated by the lighter, it is desired to have overheating safety devices so that the plastic instrumentation board is not damaged.

One prior art approach for protecting the vehicle lighter is known in U.S. Pat. No. 3,662,153. There, it is disclosed that the current-carrying bimetal springs arranged in the socket of the lighter and in the housing of the grounded socket, can create a short circuit upon overheating of the lighter, after insertion of the lighter element. The bimetal springs, therefore, serve on the one hand to heat the glow element arranged on the plug of the lighter, and on the other hand, to create the short circuit on overheating. In the latter instance, an electrical fuse is affected which cuts off the supply of electrical current to the lighter. This known overheating safety device is still effective, however, if one of the two bimetal springs arranged in the socket fails. The other bimetal spring is still effective to provide a complete circuit with the electrical fuse. If both bimetal springs fail, however, the protection fails also. Furthermore, since the bimetal springs have two contact positions (it is necessary to switch from the glow element to the housing in the case of overheating) an exact and time-consuming adjustment of the bimetal springs is necessary. This is quite costly in mass production.

SUMMARY OF THE PRESENT INVENTION

It is an object of the present invention, therefore, to provide an overheating safety device in cigar and cigarette lighters which insures a reliable and quick response to overheating conditions so that damage in the vicinity of the lighter is avoided.

It is another object of the present invention to provide an overheating safety device for cigar and cigarette lighters which can be simply arranged on the socket of the lighter without additional cost in mass production. It is a further object of the present invention to provide an overheating safety device for cigar and cigarette lighters which avoid time consuming and costly adjusting operations. It is a still further object of the present invention to provide an overheating safety device for cigar and cigarette lighters which provide rapid and reliable release of an external fusing element to disconnect electrical current to the lighter.

In accordance with the present invention, a safety device for preventing deleterious overheating of electrical cigar and cigarette lighters of the type used in motor vehicles, provides a short circuit to cause a circuit-breaking element to operate. The safety device comprises an electrical socket for the lighter and first and second electrical contacts for supplying current to the electrical socket. Insulating means are provided which are disposed between a portion of the first contact and a portion on the second contact, the insulating means softening upon overheating of the lighter. Finally, spring biasing means are included for urging an element electrically connected with the first contact against the insulating means and the insulating means against the second contact so that, upon softening of the insulating means when the lighter overheating occurs, the first and second contacts establish a short circuit.

In one embodiment of the present invention, the safety device includes an element electrically connected to the first contact which is a bent portion of the first contact. In this arrangement, the first contact is disposed immediately adjacent to the insulating means and the spring biasing means urges the first contact against the insulating means.

In another embodiment, the element electrically connected to the first contact is a portion of the spring biasing means. In this arrangement, the spring biasing means is disposed between the insulating means and the first contact and makes mechanical and electrical connection with the first contact.

Other objects and features of the present invention will become apparent by reference to the following description and drawings while the scope of the invention will be pointed out in the appended claims.

BRIEF DESCRIPTION OF THE DRAWINGS

In the drawings.

FIG. 3 illustrates the lighter of FIG. 2 in accordance with the present invention when responding to the overheating safety device.

FIG. 4 shows another embodiment of the present invention wherein the overheating safety device uses a leaf spring.

FIG. 5 illustrates the lighter of FIG. 4 when responding to the overheating condition of the safety device of the present invention.

FIG. 6 shows the leaf spring of FIG. 4 in sectional view in relaxed condition.

FIG. 6a shows the leaf spring with a pointed prong.

FIG. 7 illustrates a plan view of the leaf spring of FIG. 6.

DETAILED DESCRIPTION OF THE PRESENT INVENTION

Figure 1:
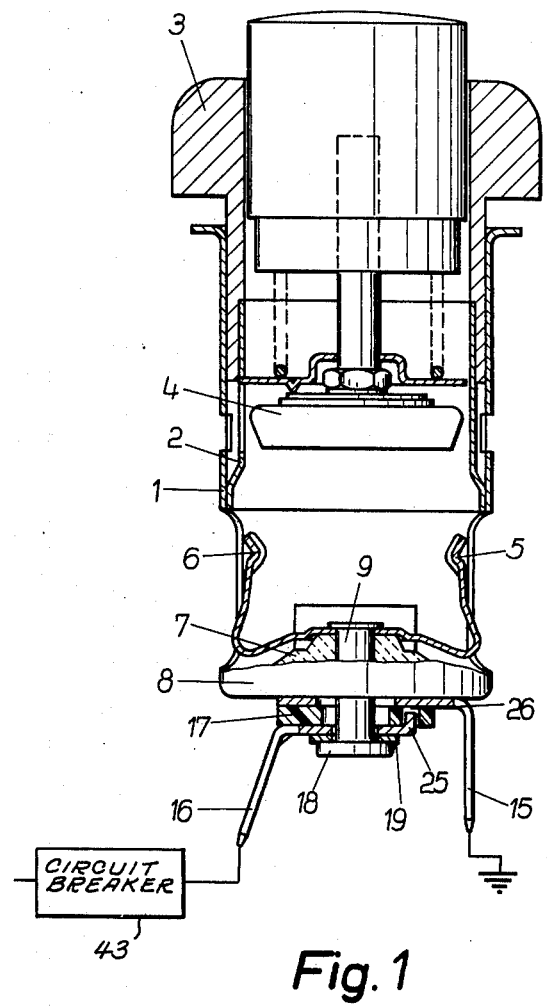
FIG. 1 illustrates a longitudinal section through a cigar and cigarette lighter in accordance with the present invention when the lighter is in rest position.
Figure 2:
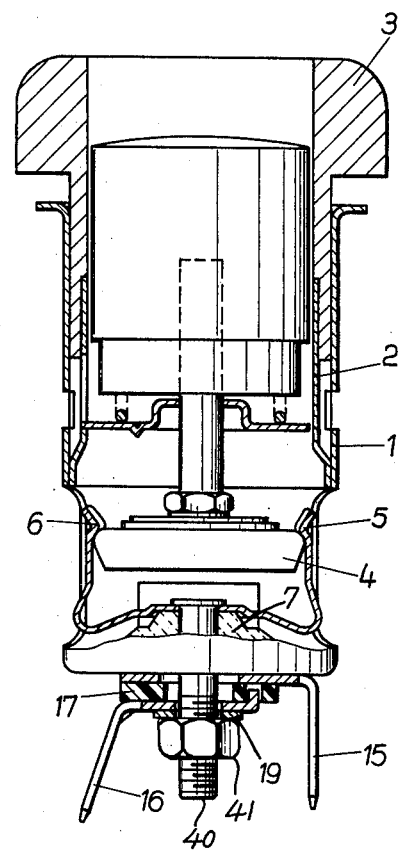
FIG. 2 illustrates the lighter of FIG. 1 in closed position for heating the glow element.

Referring to FIG. 1, shown there is a cigar or cigarette lighter which consists of a socket 1 which is secured to the instrument panel of a motor vehicle and plug 2 which is adapted to be plugged into the socket. The plug 2 is composed of handle 3 and glow element 4 for lighting cigars or cigarettes. In socket 1 are arranged two bimetal springs 5 and 6. As shown in FIG. 2, the bimetal springs are adapted to hold the plug element and provide electrical current to the glow element 4. The bimetal springs 5 and 6 are arranged on an insulating ceramic element 7 which in turn is secured to the bottom 8 of socket 1. A rivet 9 serves to mechanically connect the bimetal springs and ceramic piece 7 with the bottom of the socket 8.

The rivet 9 extends through the bottom 8 of the socket and, as shown in the Figures, bears two bent connection contacts 15 and 16 which are designed as tongue-shaped plug elements. Tongue-shaped element 15 forms the ground contact and directly comes in mechanical juxtaposition with bottom 8 of socket 1, which is a metallic element preferably of sheet metal. Tongue-shaped element 16 is connected to the positive terminal of the car or vehicle battery by way of a circuit breaker 43 and is electrically connected with bimetallic springs 5 and 6 over rivet 9. Between the two tongue-shaped elements 15 and 16, is arranged an insulating disc 17. The disc 17 may be of polyacetal resin, polyamide or of similar plastic substitutes. The insulating disc is designed to soften upon overheating. In the FIG. 1 and 2 embodiment, a spring plate 19 is arranged between tongue-shaped element 16 and insulating disc 17. The spring plate 19 presses tongue-shaped element 16 on the insulating disc 17. The insulating disc 17 also includes an opening 26. Through the opening is extended a bent portion 25 of the tongue-shaped element 16. Rivethead 18 retains spring plate 19 in FIG. 1, tongue-shaped element 16, insulating disc 17 and tongue-shaped element 15 against the bottom of the socket. In FIG. 2, the threaded element 40 and nut 41 retain the recited elements against the bottom of the socket.

If glow element 4 becomes overheated, which will occur because the bimetal springs 5 and 6 do not release the glow element in time, the insulating disc 17 will soften as shown in FIG. 3. The softening of disc 17 by high temperature results in further deformation by the force of spring plate 19 and the disc is pushed aside so that the bent portion 25 of tongue-shaped element 16 comes in mechanical and electrical contact with the tongue-shaped element 15. As a result, a short circuit occurs and the fuse or circuit breaker element in series therewith (not shown) will cut off the supply of electrical current to the lighter. An alternate structural arrangement is the provision of points or prongs on tongue-shaped element 16 which can penetrate the softened insulating disc 17. The prongs or points would, therefore, cause a short circuit between tongue-shaped element 16 and tongue-shaped element 15. In this arrangement, an opening need not be provided in the insulating disc.

Referring to FIGS. 4 through 7, an additional embodiment is shown of the overheating safety device of the present invention. In this arrangement, like numerals refer to like elements in FIGS. 1 through 3. A spring element 31, preferably formed as a leaf spring, is provided between the insulating disc 17 and the tongue-shaped element 16. As shown in FIGS. 6 and 7, an opening is provided in the leaf spring for disposing the spring over rivet 9. Also attached to the leaf spring is a bent element 30 which protrudes through an opening 26 in the insulating disc. A washer 33 is disposed between tongue-shaped element 16 and the rivethead 18.

Upon the overheating of the lighter as shown in FIG. 5, the insulating disc will soften and the leaf spring will begin to curve, forcing the bent portion 30 through the opening and contacting the tongue-shaped element 15. Because the leaf spring is metal, the simultaneous contact between element 15 and element 16 causes an electrical short circuit between those elements. A short circuit will trigger the fuse or circuit breaker element to prevent further electrical current flow to the lighter.

Accordingly, the insulating disc which softens on overheating of the lighter is made of a material whose softening point is above the operating temperature of the cigar lighter in normal operations, but below the temperature at which thermal damage may occur in the vicinity of the lighter when overheating results. As stated above, the preferred material for the insulating disc is a plastic of the polyacetal resin, polyamide or similar type. While the connection contacts for the socket are preferably designed as tongue-shaped plugs, other equivalent type shaped elements can also be employed. The tongue-shaped plugs and the insulating disc are fastened to the bottom of the socket as shown, by a rivet as in FIG. 1. A screw or similar type fastening may also be employed as in FIG. 2. On the connecting rivet or the connecting screw, the invention makes use of a spring ring or spring plate which acts on the tongue-shaped plug elements and on the insulating disc. The invention contemplates the use of points or prongs on the connection contacts which protrude into the insulating disc for penetrating the disc when it softens under the action of the spring force to cause a short circuit. A pointed prong element is shown in FIG. 6a. Element 44 is the pointed portion. Alternately, the invention provides for an opening in the insulating disc into which a bent portion of one tongue-shaped plug element or the bent portion of the spring element may protrude. Upon softening of the disc in this arrangement, the bent portion makes a short circuit with the other plug-shaped tongue element. A leaf spring is preferably employed in the latter embodiment.

While the above description has presented the preferred embodiment of the present invention, it is intended that all of the various variations and modifications as would occur to an individual skilled in the art, would be encompassed by the true spirit and scope of the present invention.

What is claimed is:

1. In an electrical cigar and cigarette lighter such as used in motor vehicles of the type having a glow heating element, an electrical power supply circuit for supplying heating current to said glow element and a circuit breaking element for limiting current through said electrical supply circuit, said lighter being subject to overheating, the improvement comprising:

a safety device for preventing deleterious overheating, said device providing a short circuit in said power supply circuit in response to excessive temperature of said lighter so as to cause said circuit breaking element to operate to deenergize said power supply circuit, and including an electrical socket for said lighter;

first and second electrical contacts on said socket and connected in said power supply circuit for supplying current to said electrical socket;

electrical insulating means, being disposed between a portion of said first contact and a portion of said second contact, said insulating means being in heat exchange relationship with said socket and being composed of a material which has a softening point above the operating temperature of the lighter in normal operation but below the temperature at which thermal damage may occur in the vicinity of the lighter when overheating results;

and spring biasing means for urging an element electrically connected with said first contact against said insulating means, said insulating means holding said element electrically connected to the first contact out of electrical engagement with the second contact until the softening of said insulating material of said insulating means occurs upon overheating of the lighter, the softening of the insulating material allowing the element electrically connected to the first contact means to be biased by the spring biasing means into electrical engagement with the second contact to establish a short circuit between the first and second contacts to operate the circuit breaking element.

2. A lighter having an improved safety device as in claim 1 wherein said insulating means material is a deformable plastic.

3. A lighter having an improved safety device as in claim 2 wherein said insulating means material is polyacetal resin.

4. A lighter having an improved safety device as in claim 2 wherein said insulating means material is a polyamide plastic.

5. A lighter having an improved safety device as in claim 1 wherein said electrical contacts have tongue portions with said insulating means disposed therebetween, and a connecting element, mounted on the socket connecting the tongue portions and insulating means to the socket.

6. A lighter having an improved safety device as in claim 5 wherein said connecting element is a rivet.

7. A lighter having an improved safety device as in claim 5 wherein said connecting element is a screw.

8. A lighter having an improved safety device as in claim 5 wherein said spring biasing means is a spring plate which is held by said connecting element.

9. A lighter having an improved safety device as in claim 1 wherein said element electrically connected to said first contact is a bent portion of said first contact, wherein said first contact is disposed immediately adjacent to said insulating means and wherein said spring biasing means urges said first contact against said insulating means.

10. A lighter having an improved safety device as in claim 9 wherein said insulating means includes an opening provided therein into which said bent portion of said first contact is disposed, said bent portion providing a short circuit with said second contact upon softening of said insulating means 11. A lighter having an improved safety device as in claim 1 wherein said element electrically connected to said first contact is a portion of said spring biasing means, said spring biasing means being disposed between said insulating means and said first contact and making mechanical and electrical connection with said first contact.

12. A lighter having improved safety device as in claim 11 wherein said insulating means includes an opening provided therein, said spring biasing means including a bent portion, said bent portion of said spring biasing means being disposed in said opening, said bent portion providing a short circuit with said second contact upon softening of said insulating means.

13. A lighter having an improved safety device as in claim 1 wherein said element electrically connected to said first contact is provided with a pointed element for penetrating said softened insulating means to establish a short circuit when said lighter is overheated.

* * * * *

UNITED STATES PATENT OFFICE
CERTIFICATE OF CORRECTION

Patent No. 4,016,400    Dated April 5, 1977

Inventor(s) Georg Seibel et al

It is certified that error appears in the above-identified patent and that said Letters Patent are hereby corrected as shown below:

In the heading of the patent [30], [73] and [75] should read as follows:

--[30] Foreign Application Priority Data
May 20, 1974    Germany .........P 24 24 385.4

[73] Assignee:
Schoeller & Co. Elektrotechnische Fabrik, GmbH & Co.,
Frankfurt, Germany

[75] Inventors: Georg Seibel, Dreieichenhain;
Günther Ante, Frankfurt am Main,
both of Germany--.

Signed and Sealed this

Seventh Day of June 1977

[SEAL]

Attest:

RUTH C. MASON
Attesting Officer

C. MARSHALL DANN
Commissioner of Patents and Trademarks